(12) United States Patent
Lakshmanan et al.

(10) Patent No.: US 7,051,318 B1
(45) Date of Patent: May 23, 2006

(54) WEB BASED OLA MEMORY GENERATOR

(75) Inventors: Viswanathan Lakshmanan, Westminster, CO (US); Cristian T. Crisan, Gresham, OR (US); Balaji Ekambaram, Portland, OR (US); Eugene V. Anikin, West Linn, OR (US)

(73) Assignee: LSI Logic Corporation, Milpitas, CA (US)

( * ) Notice: Subject to any disclaimer, the term of this patent is extended or adjusted under 35 U.S.C. 154(b) by 530 days.

(21) Appl. No.: 09/973,153

(22) Filed: Oct. 9, 2001

(51) Int. Cl.
*G06F 9/44* (2006.01)
(52) U.S. Cl. .................. 717/115; 717/107; 717/117; 717/140
(58) Field of Classification Search .................. 705/26; 717/171, 162–167, 107–140; 707/10, 501.1, 707/513
See application file for complete search history.

(56) References Cited

U.S. PATENT DOCUMENTS

| | | | |
|---|---|---|---|
| 6,405,037 B1* | 6/2002 | Rossmann | 455/426.1 |
| 6,484,149 B1* | 11/2002 | Jammes et al. | 705/26 |
| 6,766,506 B1* | 7/2004 | Ratzlaff et al. | 716/18 |
| 2002/0100034 A1* | 7/2002 | Croix | |

* cited by examiner

*Primary Examiner*—Tuan Dam
*Assistant Examiner*—Chuck Kendall
(74) *Attorney, Agent, or Firm*—Trexler, Bushnell, Giangiorgi, Blackstone & Marr Ltd.

(57) ABSTRACT

A system for generating an Open Library Architecture Delay and Power Calculation Module. The system includes a user interface for generating and submitting requests that specify configurations and types of memories for which Open Library Architecture Delay and Power Calculation Modules are needed. A server is configured to received the requests and produce Open Library Architecture Delay and Power Calculation Modules in response thereto.

20 Claims, 2 Drawing Sheets

WEB BASED OLA MEMORY GENERATOR

FIELD OF THE INVENTION

The present invention generally relates to software, OLA (Open Library Architecture) libraries, and growable memories, and more specifically relates to a system and architecture for building OLA memory modules, such as a web based OLA memory generator.

BACKGROUND OF THE INVENTION

Currently, to calculate delay associated with an integrated circuit, a delay calculation tool is used. The delay calculation tool reads in a netlist and obtains the characterized timing and power information from a compiled file, and then creates a Standard Delay Format (SDF) file based on the loading and interconnect information for the netlist.

The compiled file basically stores all characterization data for a single standard cell, and is basically a complied version of another file (a "tech file") which is the ASCII human readable format that has the timing/power information. For memories, the delay calculation tool creates a file (i.e. an annotate.v file) that has most of the timing information, and this file is created again based on the characterization information in the tech file specific to a memory type.

When performing Static Timing Analysis (STA) on the netlist using, for example, Synopsys PrimeTime, one would need the SDF file created by the delay calculation tool and also the timing information in Synopsys proprietary format (.lib files). In other words, both SDF files and .lib files (such as Synopsys proprietary files) are required.

Currently, there is no single source (repository) for timing/power information accessible to a multitude of 3rd part tools without the hassle of having to support multiple or vendor specific formats to store/represent this information. There is no architecture currently available to streamline and accurately represent all information that is specific to a given set of the technologies. There is no standardized view that accurately represents timing, power and functional information for a third party tool.

OBJECTS AND SUMMARY OF THE INVENTION

A general object of an embodiment of the present invention is to provide a system while eliminates the need to use Standard Delay Format (SDF) files for timing verification.

Another object of an embodiment of the present invention is to provide a standardized view that accurately represents timing, power and functional information for a third party tool.

Still another object of an embodiment of the present invention is to provide a system and architecture which allows the ability to represent technology specific information for timing and power with regards to memories supported by a given set of technologies.

Still yet another object of an embodiment of the present invention is to provide a system and architecture for providing a user with a Delay and Power Module for memories.

Yet still another object of an embodiment of the present invention is to provide an infrastructure which allows a user to dynamically create configuration of memories that are needed.

Yet still another object of an embodiment of the present invention is to provide a server which eliminates the need to provide compilers at each of the users' stations.

Briefly, and in accordance with at least one of the foregoing objects, an embodiment of the present invention provides a system for generating an Open Library Architecture Delay and Power Calculation Module. The system includes a user interface for generating and submitting a request to a server. The request specifies a configuration and type of memory for which an Open Library Architecture Delay and Power Calculation Module is needed. A server is configured to receive the request from the user interface, and produce the Open Library Architecture Delay and Power Calculation Module in response to the request.

Preferably, the user interface includes a memory generation tool that is used to create a Delay Calculation Language model, and the user interface is configured to generate the request based on the Delay Calculation Language model. Preferably, the memory generation tool uses a library of templates to create the Delay Calculation Language model. The user interface is preferably configured to create a Hyper Text markup Language file based on the Delay Calculation Language model. Ideally, the Hyper Text Markup Language file is configured to allow the user to select a memory configuration and type for which an Open Library Architecture Delay and Power Calculation Module is needed.

Preferably, the server is configured to receive the request for the Open Library Architecture Delay and Power Calculation Module from the user interface and is configured to generate the Open Library Architecture Delay and Power Calculation Module in response to the request. Specifically, the server creates a Delay Calculation Language memory module based on the request, and compiles the Delay Calculation Language memory module into C-source, and compiles the C-source into the Open Library Architecture Delay and Power Calculation Module.

The server may include, for example, Common Gateway Interface/Practical Extraction and Report Language Script which is configured to process the request, or may include, for example, a C program or other code for processing the request. If Common Gateway Interface/Practical Extraction and Report Language Script is provided, the script may be configured to process the request by sourcing necessary environment variables, running the memory generation tool to create the Delay Calculation Language memory module, invoking a first compiler to compile the Delay compiler to compile the C-source to create the Open Library Architecture Delay and Power Calculation Module. Preferably, the script is configured to create Delay Calculation language side files which are used during the compilation with information on relevant include files and calculation files. Ideally, once the server has generated the Open Library Architecture Delay and Power Calculation Module, the Open Library Architecture Delay and Power Calculation Module can be downloaded from the server.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

Figure 1:
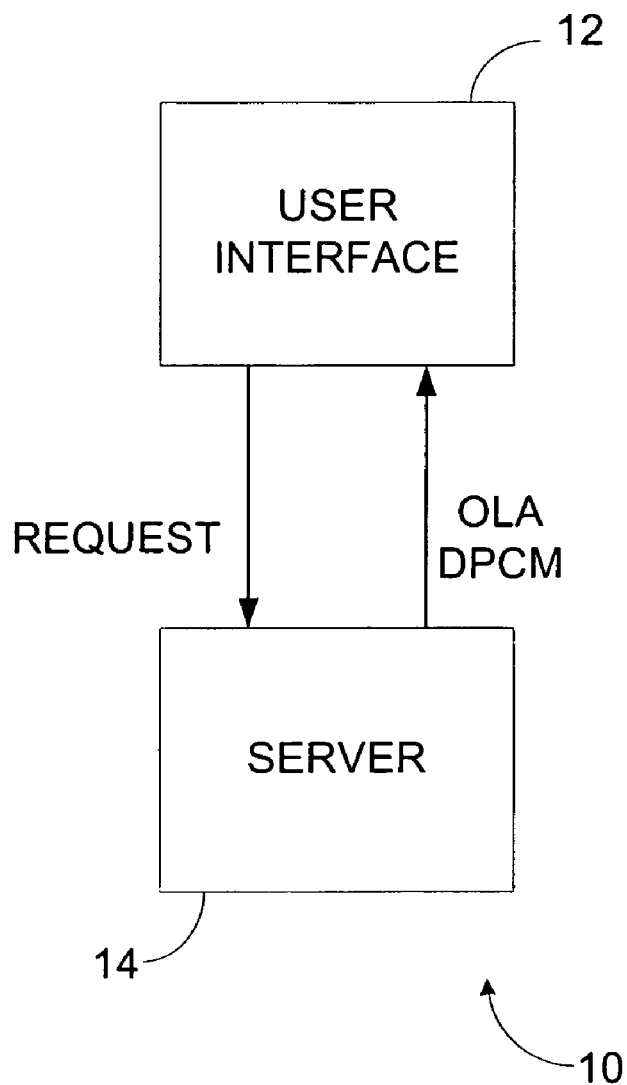
FIG. 1 is a block diagram of a system which is in accordance with an embodiment of the present invention, wherein the system includes a user interface configured to generate a request and forward the request to a server which generates an Open Library Architecture Delay and Power Calculation Module in response to the request.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 illustrates a system 10 which is in accordance with an embodiment of the present invention. The system 10 includes a user interface 12 which is configured to generate a request and forward the request to a server 14. The server 14 is configured to generate an Open Library Architecture Delay and Power Calculation Module (OLA DPCM) in response to the request received from the user interface 12. The system does not require the use of SDF and .lib files, and effectively provides a single source (repository) for timing/power information which is accessible to a multitude of 3rd party tools without the hassle of having to support multiple or vendor specific formats to store/represent this information. The system also streamlines and accurately represents all information that is specific to a given set of technologies and provides a standardized view that accurately represents timing, power and functional information for a third party tool. The system allows a user to dynamically create configurations of memories that are needed, without having to provide compilers at each station.

Figure 2:
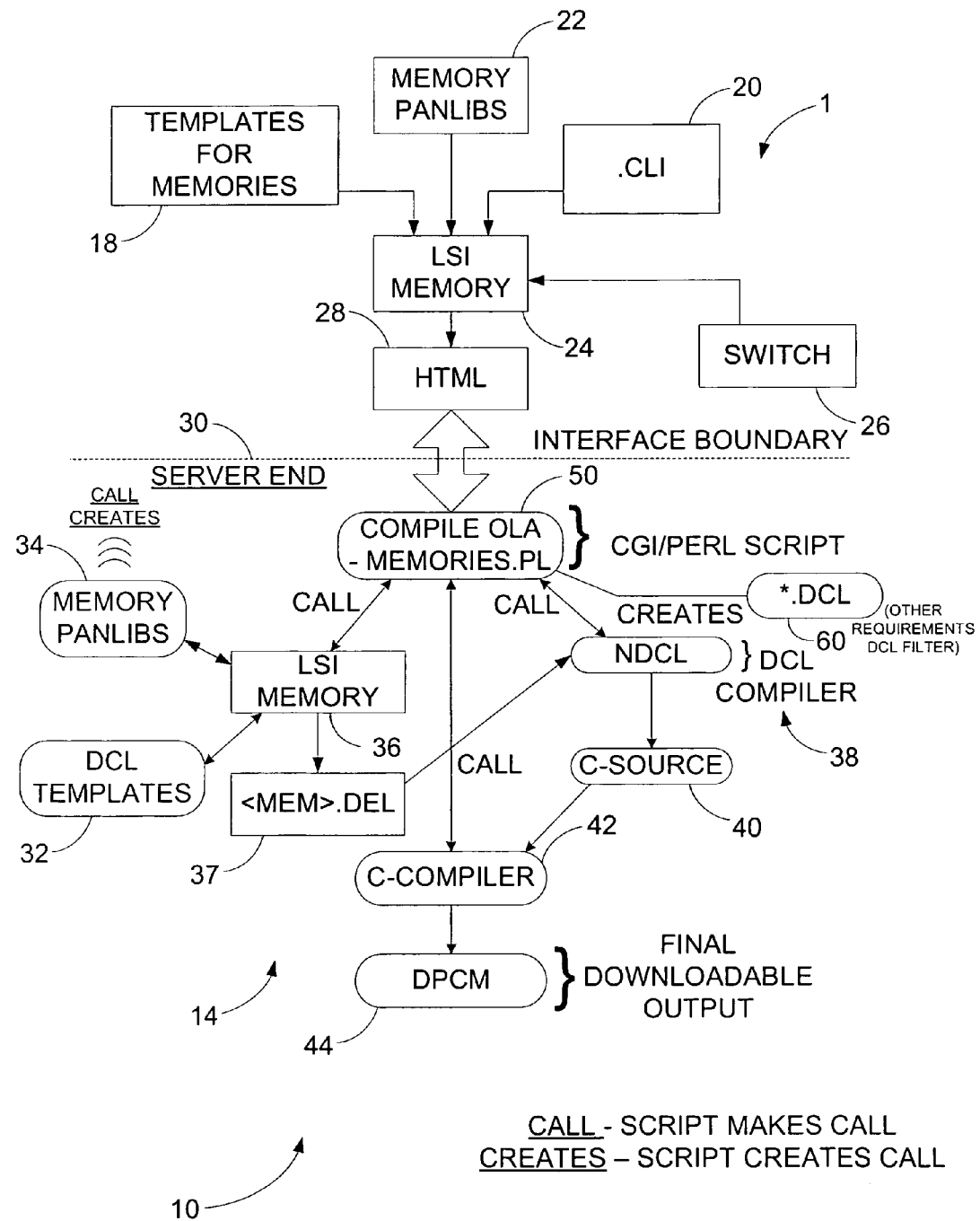
FIG. 2 is a flow diagram of the system shown in FIG. 1.

FIG. 2 is a flow diagram of the system shown in FIG. 1, and provides a more detailed illustration. As shown, the "user end" or user interface 12 includes a library of memory templates 18, memory files 20 (".cli" in FIG. 2), a library of memories 22 ("Memory Panlibs" in FIG. 2), and a memory generation tool 24 ("LSIMEMORY" in FIG. 2) which is configured to read and create DCL modules. Preferably, the user interface 12 also includes a switch 26 ("gen_ola_html") which effectively tells the memory generation tool 24 to create an HTML file 28 that the user can load into a browser. The HTML file 28 allows the user to select the configuration/types of memories for which he or she needs an OLA DPCM.

As shown in FIG. 2, the "user end" or user interface 12 is interfaced with the "server end" or server 14 across an interface boundary 30. The user interface 12 is configured such that a user can use the interface 12 to generate a request for an OLA DPCM and submit the request to the server 14 across the interface boundary 30. The server 14 is configured to process the request and provide the OLA DPCM.

The server 14 includes a library of DCL templates 32, a library of memories 34 ("Memory Panlibs" in FIG. 2), a DCL model generation tool 36 ("LSIMEMORY" in FIG. 2) for generating a DCL model 37 ("<mem>.dcl") based on the request which is received from the user interface 12, a first compiler 38 for compiling the DCL model 37 into C-source 40, and a second compiler 42 for compiling the C-source 40 to create an OLA DPCM 44. The OLA DPCM 44 is preferably provided in the form of an output which is downloadable across the interface boundary 30 at the "user end" (i.e. view the user interface 12).

The server includes code 50, such as CGI/PERL script and other associated script, for processing the request received from the user interface 12. If the code is provided as CGI/PERL script, the script may be as follows:

```
#!/user/local/bin/perl
##$PREFIX="/lsi/home/pd/WWW/cgi-bin/CDCT_
   BALAJI/OLA";
$PREFIX="/lsi/dv/cdct_www/ola/ola_mem_run_dir";
$session_id="ola_$$";
$LOGPREF="$PREFIX/$session_id/run_";
$TABLE_DEF_PATH="/lsi/home/ola/dev/generic_data/in-
   clude";
$ndcl="/lsi/home/ola/bin/SOL/bin/ndcl";
select((select(STDOUT), $|=1) [0]);
select((select(STDERR), $|=1) [0]);
print "Content-type: text/html\n\n";
&Parse_form;
sub ErrorMessage {print "The server cannot open the file. It
   does not exist or the permissions are wrong.\n"; exit(0);}
sub Parse_form {if ($ENV{'REQUEST_METHOD'} eq
   'GET')                        {@pairs=split(/&/,
   $ENV{'QUERY_STRING'});}
elsif ($ENV{'REQUEST_METHOD'} eq 'POST') {read
   (STDIN, $buffer, $ENV {'CONTENT_LENGTH'});
   @pairs=split(/&/, $buffer);}
else {print "Content-type: text/html\n\n"; print "<P>Use
   Post or Get";}
foreach $pair (@pairs) {($key, $value)=split (/=/, $pair);
   $key=~tr/+//; $key=~s/%([a-fA-F0-9] [a-fA-F0-9])/pack
   ("C", hex($1))/eg; $value=~tr/+//; $value=~s/%([a-fA-
   F0-9] [a-fA-F0-9])/pack("C", hex ($1))/eg; $value=~s/
   <!—(.\n)*—>//g;    if    ($formdata    {$key})
   {$formdata{$key}.=",            $value";            }else
   {$formdata{$key}=$value; }}
foreach $key (sort keys(%formdata)) {if ($formdata
   {$key}eq "") {print "<P>The field $key was not filled in.
   A value must be entered to process your request."; exit
   (0);}if    ($key    eq    OLALibNameEntryBox)
   {$dpcmlibname=$formdata {$key}; }}}
#HTML section
print "<HTML><HEAD>\n<TITLE>";
PRINT "<title>\N</head><BODY bgcolor=\"#ffffff\">\n";
print "</BODY></HTML>";
mkdir "$PREFXI/$session_id", 0777;
'chmod -R 777 $PREFIX/$session_id';
chdir "$PREFIX/$session_id";
$logname=$LOGPREF.$session_id.".log";
print "<br><br>";
print                             "<center><b><u><font
   size=\"5\"face=\"Arial\">Executing OLA memory
generation Step 1 of 2—Running lsimemory—</font></
   b><br></center></u>";
#Running lsimemory to create the DCL models
foreach $memory (keys %formdata) {next unless
   ($memory=~/^memchk/i); print "<P>Running $formdata
   {$memory}\n"; 'touch lsitk.options'; #Create Write per-
   missions for lsitk.options. 'chmod 777 ./lsitk.options';
   @run='rsh -1 pd dv53s46/lsi/dv/cdct_www/ola/scripts/
   scr
\\\"$formdata {$memory}\\\" $logname RPREFIX/$ses-
   sion_id';
#print @run; }
print "<br>";
print "<br>";
print "<br>";
print                             "<center><b><u><font
   size=\"5\"face=\"Arial\">Executing Step 2 of 2 —DCL
```

```
Compilation—</font></b><br></center></u>";
print "<P>\n";
print "$LSI_RELEASE";
#Copy any existing DCL models from ./memory/OLA dir to CWD.
#$oladir="memory/OLA";
#if ($oladir) {#'cp memory/OLA/*.dcl.'; #}
#Iterate thru the DCL to get technology specific information and create <tech> _memory.dcl etc.
foreach $file (<*.dcl>)
{open (DCL, $file); while (<DCL>) {if (/Technology\s*:\s+
   (lcbg12|gflx)/) {push @{$techs {$1}}, $file; last;} }
}
foreach $tech (keys %techs)
{open (FILE, ">${tech}_memory.dcl"); print FILE "// Set
   the technology\n"; print FILE "tech_family($tech);\n";
   print FILE "\n"; print FILE "// Table definitions\n";
######NEW INCLUDE FILES #####print FILE "#include
   \"$TABLE_DEF_PATH/memory/table_import.dcl\"\n";
   print FILE "#include \"$TABLE_DEF_PATH/memory/
   import.dcl\"\n"; print FILE "#include \"$TABLE_DEF_
   PATH/memory/method.dcl\"\n"; print FILE "#include
   \"$TABLE_DEF_PATH/memory/common.inc\"\n"; print
   FILE     "#include     \"$TABLE_DEF_PATH/memory/
   table_empty.data\"\n"; print FILE "#include \"$TABLE_
   DEF_PATH/all/table_import.dcl\"\n";    print    FILE
   "#include    \"$TABLE_DEF_PATH/all/import.dcl\"\n";
   print   FILE   "#include   \"$TABLE_DEF_PATH/all/
   method.dcl\"\n"; print FILE "#include \"$TABLE_DEF_
   PATH/all/common.inc\"\n"; print FILE "#include \
   "$TABLE_DEF_PATH/all/table_empty.data\"\n";
####################################
#print    FILE     "#include     \"$TABLE_DEF_PATH/
   lib_table_import.dcl\"\n";
#print    FILE     "#include     \"$TABLE_DEF_PATH/
   memory_table_import.dcl\"\n";
#print    FILE     "#include     \"$TABLE_DEF_PATH/
   import.dcl\"\n";
#print    FILE     "#include     \"$TABLE_DEF_PATH/
   memory_import.dcl\"\n";
#print FILE "#include \"$TABLE_DEF_/common.inc\"\n";
#print    FILE     "#include     \"$TABLE_DEF_PATH/
   lib_table_empty.data\"\n";
#print    FILE     "#include     \"$TABLE_DEF_PATH/
   memory_table_empty.data\"\n";
#print    FILE     "#include     \"$TABLE_DEF_PATH/
   method.dcl\"\n"; print FILE "\n"; print FILE "// Library
   Specific    Properties\n";   print    FILE   "#include
   \"${tech}_Cell_List.data\"\n"; print FILE "\n"; print
   FILE "// Cell Specific Properties\n"; foreach $file
   (@{$techs {$tech}}) {print FILE "#include \"$file\"\n";
   }print FILE "calc(LATENT_EXPRESSION):\N"; print
   FILE    "result    (\n";   print   FILE   "integer:
   N=messageLoadRule('${tech}_memory','',\n";   print
   FILE               "n=addLibrary('${tech}_memory',
   '${tech}_memory')\n"; print FILE ");\n"; open (FILE,
   ">${tech}_Cell_List.data");    print    FILE    "table
   (Cell_List):\n"; #print FILE "table (${tech}_13Cell_List):
   \n"; print FILE "${tech}_memory: \n"; @starlist=();
   @behavlist=(); @tmplist=@{$techs }$tech}}; foreach
   $file (@tmplist) {$file=~sˆ.dcl//; push @starlist, "*", "*";
#push @behavlist, "behavior", "timing"; push @behavlist,
   "power", "timing";}@tmplist=sort (@tmplist, @tmplist);
   $list=join   "\',\"",    @tmplist;   $starlist=join   "\',   \"",
   @starlist; $behavlist=joint "\', \"", @behavlist; $list=us
   ($list); print FILE "['$list']\n"; print FILE "['$starlist']
   \n"; print FILE "['$behavlist']; \n"; print FILE "end;\n";
close FILE; #Set the license file for ndcl and c compiler.
   Set path to c complier and linker. $ENV {"LM_LI-
   CENSE_FILE"}=
"/lsi/dv/licenses/se2:/lsi/soft/sc-5.0/license_dir/license.dat",
   $ENV{"PATH"}="/lsi/soft/sc-5.0/bin:/usr/ccs/bin:/usr/
   local/bin"; #Call ndcl to compile the concatenated dcl
   files    @ndcl='$ndcl   —DCOMPILE_MODELS -v -o
   $tech_${dpcmlibname}
${tech}_memory.dcl    2>&1';    ###print    @ndcl;
   @ndcl='$ndcl     —DCOMPILE_TABLES     -v    -dt
   ${tech}_memory.dcl2>&1'; ###print @ndcl; }
#Check for existence of the dpcm
if   (-f   "$tech_${dpcmlibname}")    {'/usr/local/bin/mkdir
   $tech_${dpcmlibname}.dir';      'chmod      -R     777
   $tech_${dpcmlibname}.dir';              '/usr/local/bin/mkdir
   $tech_${dpcmlibname}.dir/data';      'chmod    -R    777
   $tech_${dpcmlibname}.dir/data';                  '/bin/mv
   $tech_${dpcmlibname}       $tech_${dpcmlibname}.dir';
   '/bin/mv *.table $tech_${dpcmlibname}.dir/data'; '/usr/
   bin/tar        cvf       $tech_${dpcmlibname}.tar
   $tech_${dpcmlibname}.dir';            '/usr/local/bin/gzip
   $tech_${dpcmlibname}.tar';
###'/bin/ln -s $PREFIX/$session_id/lsi/dv/cdct_www/ola/
   temp'; print "<br><h3 align=\"center\"><A
HREF=\"http://gresham5.1sil.com/gread/cdct_www/ola/
   ola_mem_run_dir/$session_id/ $tech_${dpcmlibname}.t
   ar.gz\">Download Result By Shift-Clicking Here</a></
   h3>\n";
print "<br><b><center><font color=\"#ff0000\"size=\"3\"
   face=\"Arial\">—Clean
up of results is done every Tuesday at 2:00 AM PST—</
   font></b><br></center>";
#Create Write permissions for the log and memory sub-
   directories.
#chdir "$PREFIX/$session_id";
#'chmod -R 777*'; }
#Delete the session id directory
#chdir "$PREFIX/";
#'/bin/rm -rf $PREFIX/$session_id';
   The foregoing script may be configured to invoke other
script such as:
#!/bin/csh -f
setenv LSI_PERL ~/usr/local/bin/perl5.00503
setenv LSIADMIN ~lsirels
setenv LSI_LICENSE_FILE ~lsirels/generic/acctmgr/li-
   cense.dat
setenv LSI_RELEASE $LSIADMIN/lis_fs_3.0
setenv TK—NOHIERARCHY TK_NOHIERARCHY_ON
source $LSI_RELEASE/scripts/lsi.alias
source $LSI_RELEASE/scripts/lsi.setenv
###$1 contains the command, $2 contains the log file, $3
   contains the run dir.
cd "$3"
###cp/lis/home/ccirsan/FS30/src/lsimemory/obj/SunOS-
   5.7/lsimemory.
$1>>$2
/bin/chmod 777 run_ola*
/bin/chmod -R 777 *.log
/bin/chmod -R 777 rr*
/bin/chmod -R 777 RR*
/bin/chmod -R 777 *.cli
/bin/chmod -R 777 *.pan
   Use of the system 10 will now be described. Initially, the
user knows what specific memory configurations he needs
and what type of memories, specified in a .cli file 20, and the
user has access to "LSIMEMORY", the memory generation
tool 24. The user interface 12 is configured such that the
``` environment is set up correctly for the user to access memory templates 18 and other technology specific files. The memory generation tool 24 reads the DCL templates to create DCL models (an intermediate output format). When the "gen_ola_html" switch 26 is used with the memory generation tool 24, the memory generation tool 24 creates an HTML file 28 that the user can load into a browser. The user loads the HTML file 28 and selects the configurations/types of memories for which he or she needs an OLA DPCM and then submits a request to the server 14. The GGI/PERL script (or other code) 50 then processes the request by: sourcing the necessary environment variables, running the DCL model generator 36 to create DCL models 37, invoking the DCL complier 38 to compile the DCL models 37 into C-source 40, creating DCL side files which are used during DCL complication with information on relevant include files and calculation files (60 in FIG. 2), invoking the C-compiler 42 to compile the C-source 40 which has been created in order to create the OLA DPCM module 44, and creating a link to the newly created OLA DPCM module 44 which the user can use to download the OLA DPCM module 44 which has been generated by the server 14.

The system provides a web based system of creating OLA memories, provides that memories of any type/configuration can be generated on the fly, eliminates the need for DCL/C compilers in the field (i.e. at each user interface), and provides an ideal, easy to access and easy to use OLA solution. Additionally, being web based, the system is very accessible. By eliminating the need for DCL/C compilers in the field (i.e. at each user interface), the system is cost effective. Furthermore, there is a reduction in cycle time owing to the dynamic nature of the memory generation scheme.

While an embodiment of the present invention is shown and described, it is envisioned that those skilled in the art may devise various modifications of the present invention without departing from the spirit and scope of the appended claims.

What is claimed is:

1. A server configured to receive a request for an Open Library Architecture Delay and Power Calculation Module and produce the Open Library Architecture Delay and Power Calculation Module in response to the request, said server configured to create a Delay Calculation Language memory module based on the request, compile the Delay Calculation language memory module into the Open Library Architecture Delay and Power Calculation Module, wherein DCL/DPCM data for a specific memory configuration is created, and invoke a compiler to compile C-source to create the Open Library Architecture Delay and Power Calculation Module, wherein Delay Calculation Language side files are created which are used during the compilation.

2. A server as defined in claim 1, wherein said server is configured o compile the Delay Calculation Language memory module into an intermediate form, and is configured to compile the intermediate form into the Open Library Architecture Delay and Power Calculation Module.

3. A server as defined in claim 2, wherein the intermediate form is C-source.

4. A server as defined in claim 1, wherein the server is configured such that the Open Library Architecture Delay and Power Calculation Module is downloadable.

5. A server as defined in claim 1, wherein the server is configured to receive a request which specifies the configuration and types of memories for which an Open Library Architecture Delay and Power Calculation Module is needed.

6. A server as defined in claim 1, further comprising Common Getaway Interface/Practical Extraction and Report language Script which is configured to process the request.

7. A server as defined in claim 6, wherein the Common Getaway Interface/Practical Extraction and Report Language Script is configured to process the request by sourcing necessary environment variables, running a memory generation tool to create Delay Calculation Language memory modules, invoking a compiler to compile the Delay Calculation Language memory modules.

8. A server as defined in claim 7, wherein the Common Gateway Interface/Practical Extraction and Report Language Script is configured to invoke a first compiler to compile the Delay Calculation Language memory modules into C-source, and invoking a second compiler to compile the C-source to create the Open Library Architecture Delay and Power Calculation Module.

9. A server as defined in claim 7, wherein the Common Gateway Interface/Practical Extraction and Report Language Script is configured to create Delay Calculation Language side files which are used during the compilation.

10. A web based Open Library Architecture memory generator configured to receive a request for an Open Library Architecture Delay and Power Calculation Module and produce the Open Library Architecture Delay and Power Calculation Module in response to the request, wherein the request specifies the configurations and types of memories for which an Open Library Architecture Delay and Power Calculation Module is needed, said web based Open Library Architecture memory generator configured to create a Delay Calculation Language memory module based on the request, and compile the Delay Calculation Language memory module into the Open Library Architecture Delay and Power Calculation Module, wherein said web based Open Library Architecture memory generator is configured to compile the Delay Calculation Language memory module into C-source, and is configured to compile the C-source into the Open Library Architecture Delay and Power Calculation Module, wherein said web based Open Library Architecture memory generator is configured such that the Open Library Architecture Delay and Power Calculation Module is downloadable, said web based Open Library Architecture memory generator further comprising code configured to process the request by sourcing necessary environment variables, running a memory generation tool to create Delay Calculation Language memory modules, invoking a first compiler to compile the Delay Calculation Language memory modules into C-source, and invoking a second compiler to compile the C-source to create the Open Library Architecture Delay and Power Calculation Module, wherein the code is configured to create Delay Calculation Language side files which are used during the compilation.

11. A user interface for generating and submitting a request for an Open Library Architecture Delay and Power Calculation Module, wherein the request specifies a configuration of memories for which the Open Library Architecture Delay and Power Calculation Module is needed, said user interface comprising a memory generation tool useable to create a Delay Calculation Language model, said user interface configured to generate the request based on the Delay Calculation Language model, wherein DCL/DPCM data for a specific memory configuration is created, and said user interface configured to invoke a compiler to compile C-source to create the Open Library Architecture Delay and Power Calculation Module, wherein Delay Calculation Language side files are created which are used during the compilation.

12. A user interface as defined in claim 11, further comprising a library of templates which the memory generation tool uses to create the Delay Calculation Language model.

13. A user interface as defined in claim 11, wherein the user interface is configured to create a Hyper Text Markup Language file based on the Delay Calculation language model.

14. A user interface as defined in claim 13, wherein said Hyper Text Markup Language file is configured to provide selectability of memory configurations and types.

15. A user interface as defined in claim 11, wherein the user interface is configured such that an Open Library Architecture Delay and Power Calculation Module based on the request is downloadable.

16. A method of obtaining an Open Library Architecture Delay and Power Calculation Module, said method comprising employing a user interface to generate a request for the Open Library Architecture Delay and Power Calculation Module, sending the request to a server, having the server generate the Open Library Architecture Delay and Power Calculation Module, downloading from the server the Open Library Architecture Delay and Power Calculation Module which has been generated by the server, wherein DCL/DPCM data for a specific memory configuration is created, and invoking a compiler to compile C-source to create the Open Library Architecture Delay and Power Calculation Module, wherein Delay Calculation Language side files are created which are used during the compilation.

17. A method as defined in claim 16, wherein the request specifies the configurations and types of memories for which an Open Library Architecture Delay and Power Calculation Module is needed.

18. A method as defined in claim 16, further comprising using a memory generation tool to create a Delay Calculation Language model, and having the user interface generate the request based on the Delay Calculation Language model.

19. A method as defined in claim 16, further comprising using a library of templates to create the Delay Calculation Language model.

20. A system for generating an Open Library Architecture Delay and Power Calculation Module, said system comprising: a user interface for generating and submitting a request for the Open Library Architecture Delay and Power Calculation Module, wherein the request specifies a configuration of memories for which the Open Library Architecture Delay and Power Calculation Module is needed; a server configured to receive the request for the Open Library Architecture Delay and Power Calculation Module from the user interface and produce the Open Library Architecture Delay and Power Calculation Module in response to the request, wherein DCL/DPCM data for a specific memory configuration is created; and invoke a compiler C-source to create the Open Library Architecture Delay and Power Calculation Module, wherein Delay Calculation side files are created which are used during the compilation.

* * * * *